Jan. 2, 1968  H. C. SWIFT  3,361,229
CALIPER-TYPE DISK BRAKES
Filed April 25, 1966  3 Sheets-Sheet 2
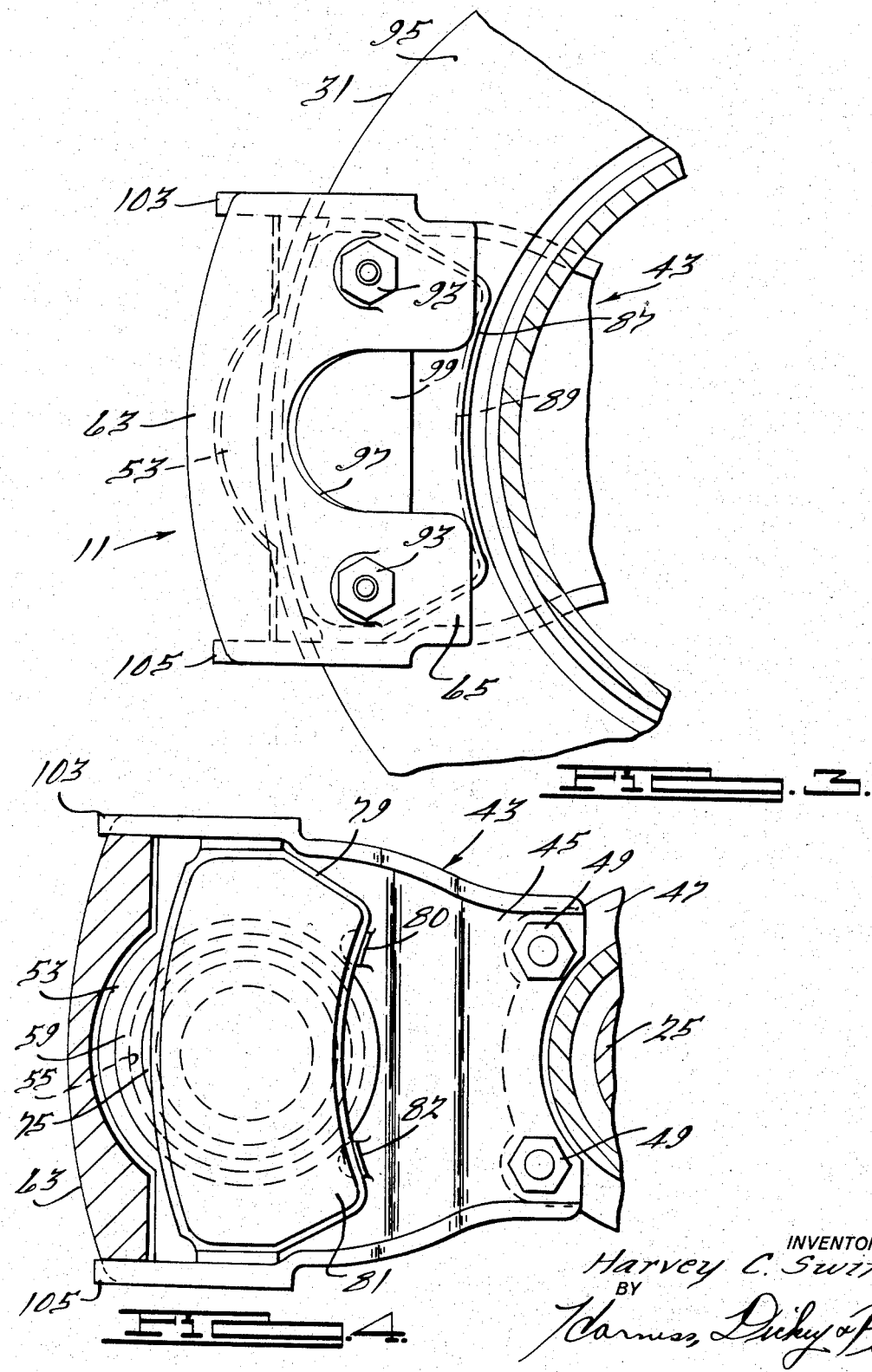
INVENTOR.
Harvey C. Swift
BY
Harness, Dickey & Pierce
ATTORNEYS

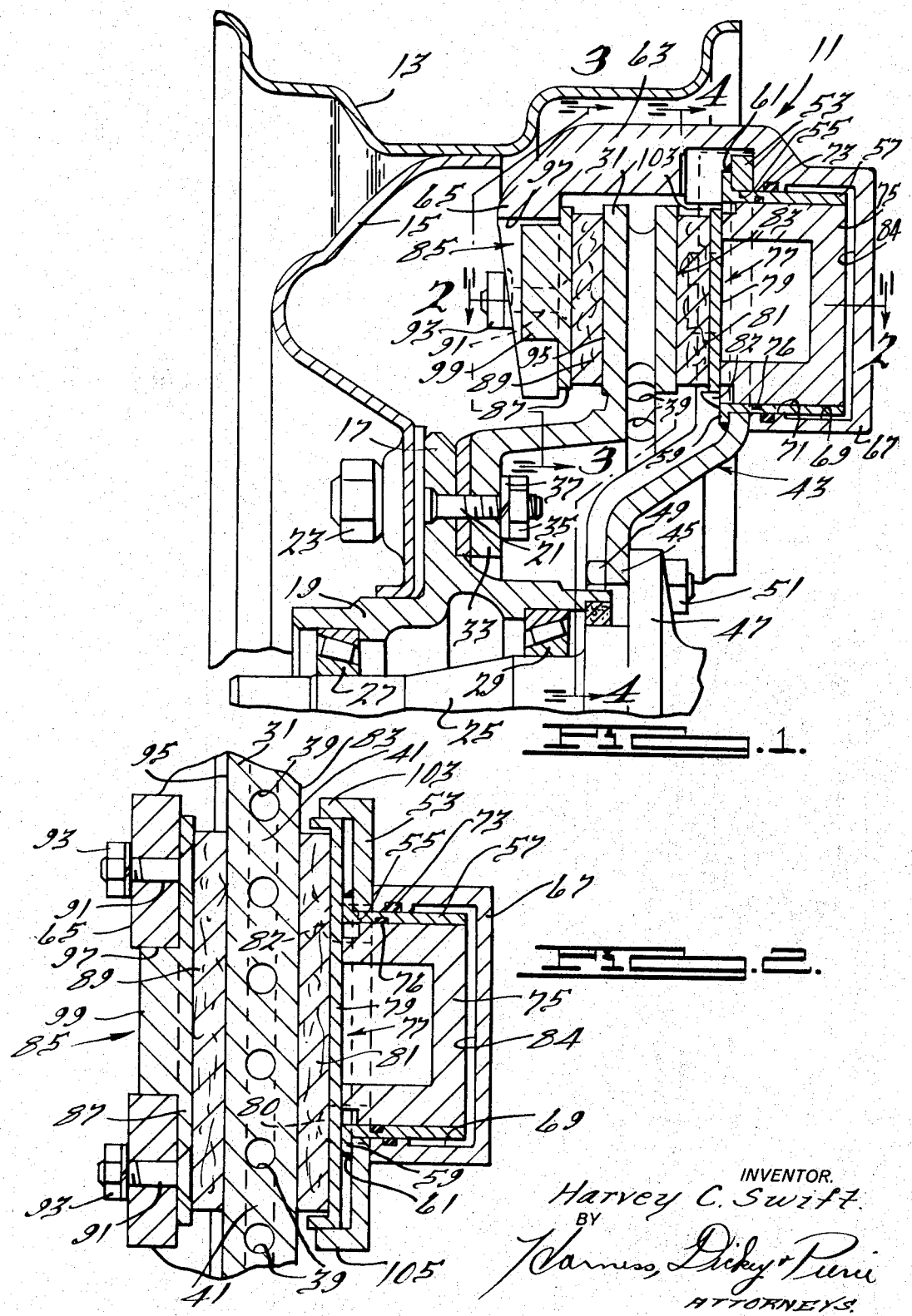

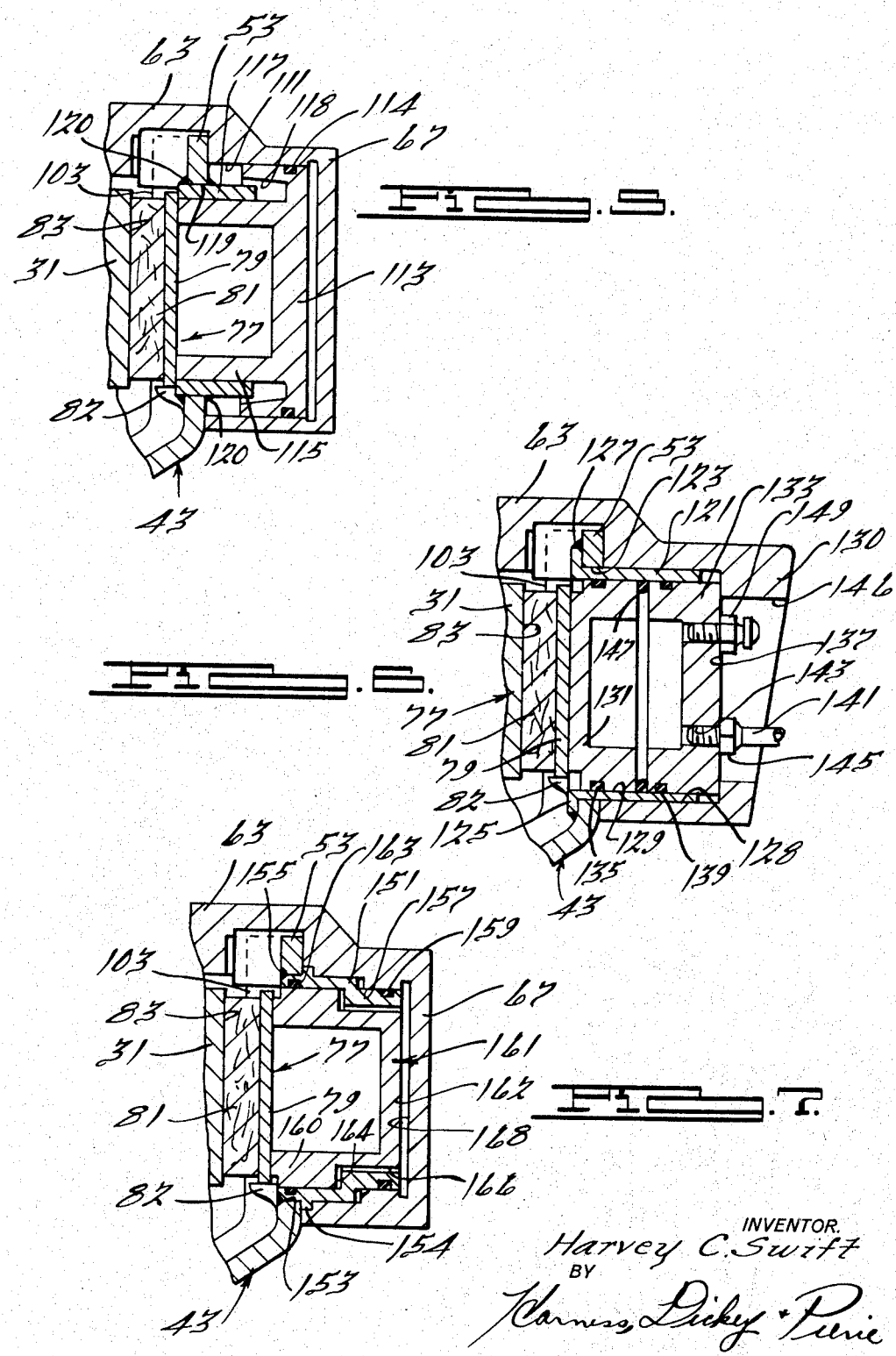

United States Patent Office 3,361,229
Patented Jan. 2, 1968

3,361,229
CALIPER-TYPE DISK BRAKES
Harvey C. Swift, Birmingham, Mich., assignor to Kelsey-Hayes Company, Romulus, Mich., a corporation of Delaware
Filed Apr. 25, 1966, Ser. No. 545,132
5 Claims. (Cl. 188—73)

ABSTRACT OF THE DISCLOSURE

The invention is in caliper-type disk brakes. A sleeve member is secured to a fixed support. The caliper-slidably engages the outer peripheral surface of the sleeve member to form a portion of the means to actuate the brake. At least one piston is received within the sleeve member to form another portion of the actuating means. Said one piston directly forces a friction pad into engagement with an associated disk while the caliper forces another friction pad into engagement with an opposite side of the disk.

---

This invention relates generally to brakes, and particularly to an improved disk brake construction.

An important object of the present invention is to provide a disk brake of the moving caliper type having an improved caliper supporting and guiding construction.

A further object of the present invention is to provide a disk brake of the above character having improved torque reaction characteristics.

A further object of the present invention is to provide a disk brake of the above character wherein the caliper is slidably guided on a fluid bearing.

A still further object is to provide a disk brake of the above character which utilizes brake energizing fluid pressure to dampen vibrations and reduce noise between the parts and to resist twisting and distortion and maintain stability of the brake supporting construction.

A still further object of the present invention is to provide a novel hydraulic motor construction for a caliper type disk brake which motor is adapted to apply equal pressure to brake shoes on either side of a rotor.

Additional objects and advantages of the present invention include the provision of a disk brake of the above character which is relatively inexpensive to manufacture, rugged in construction and reliable and efficient in use.

Other objects and advantages of the present invention will become more apparent from a consideration of the following detailed description taken in conjunction with the drawings in which:

FIGURE 1 is a sectional view of a portion of a vehicle wheel showing a typical installation of a preferred form of the present invention;

FIG. 2 is a sectional view of FIG. 1 taken along the line 2—2 thereof;

FIG. 3 is a sectional view of FIG. 1 taken along the line 3—3 thereof;

FIG. 4 is a sectional view of FIG. 1 taken along the line 4—4 thereof;

FIG. 5 is a fragmentary sectional view, similar to FIG. 1, illustrating a modified form of the present invention;

FIG. 6 is a view, similar to FIG. 5, illustrating another modified form of the present invention; and FIG. 7 is a view, similar to FIGS. 5 and 6, illustrating still another form of the present invention.

Broadly described, the present invention relates to a disk brake for use with a rotor rotatable about a central axis and comprises stationary torque reaction means, a stationary sleeve fixed on said torque reaction means, a housing operatively supported by said sleeve for movement parallel to said axis, said housing having a fluid motor portion on one side of said rotor and a reaction portion on the other side of said rotor, said fluid motor portion having a bore, piston means, said piston means and said sleeve being at least partially received within said bore, a first brake shoe means positioned between said piston means and said rotor and a second brake shoe means positioned between said housing reaction portion and said rotor whereby energization of said piston and consequent reactive movement of said housing will press said brake shoe means against said rotor.

Referring now more specifically to the drawings wherein like numerals refer to like parts in all the figures, a preferred form of disk brake is illustrated in FIGS. 1–4 and is shown generally at 11 in FIG. 1. This form of disk brake 11 is seen associated with a wheel including a rim 13 having a web 15 secured to a mounting flange 17 on a hub 19 by bolts 21 and nuts 23. The hub 19 is rotatably support upon a fixed wheel spindle 25 by spaced bearings 27, 29 in the usual manner. A conventional brake disk or rotor 31 is mounted for rotation about a central axis by having a laterally offset flange 33 secured to the hub flange 17 by the bolts 21. The rotor flange 33 is held in place on the bolts 21 by nuts 35 and lock washers 37. The rotor 31 has a plurality of radial openings 39 spaced apart by web portions 41 which act as fan blades to convey cooling air through the openings 39 during turning movement of the rotor 31.

A torque reaction member or spider 43 is stationarily mounted by having a laterally offset, inner flange 45 secured to a flange 47 on the wheel spindle 25 by bolts 49 and nuts 51. The spider 43 has an outer arm 53 which is centrally apertured at 55. A sleeve 57 extends through the aperture 55 and has a radially outwardly extending flange 59 overlying the torque arm 53 and welded thereto at 61.

A housing or caliper 63 has spaced dependent portions or legs 65, 67 embracing a portion of the motor 31. The leg 67 forms a fluid motor portion and has a bore 71 opening to the inside of the leg and which bore slidably receives the sleeve 57. An annular seal 73 is carried within the bore 71 and sealingly engages the sleeve 57. The bore 71 is relieved at 69 for a purpose to be described.

The inner wall of the sleeve 57 forms a cylinder bore which slidably receives a piston 75 and carries an annular seal 76 which sealingly engages the piston 75. The piston 75 is adapted to move longitudinally relative to the fixed sleeve 57 and axially of the rotor 31 under the force of pressurized fluid in the bore 71. Pressurized fluid is admitted to the bore 71 from a conventional master cylinder (not shown) communicated therewith by a conduit means (not shown) in the usual manner. A brake shoe 77 is positioned between the piston 75 and the rotor 31 and includes a backing plate 79 having brake lining 81 bonded or riveted thereto in the usual manner. The backing plate 79 is supported by a pair of ears 80, 82 integral with the outer arm 53 of the torque spider 43 and is engageable with the piston 75 so that left-hand directional movement of the piston presses the brake lining 81 into frictional engagement with a radial braking face 83 on the rotor 31.

The reaction to fluid pressure in the bore 71 acts against an end wall 84 of the bore and biases the caliper 63 toward the right as seen in FIGS. 1 and 2. Another brake shoe 85 which includes a backing plate 87 having brake lining 89 bonded or riveted thereto is fixed to the caliper reaction portion or leg 65 by bolts 91 and nuts 93. Thus, right-hand directional movement of the caliper 63 presses the brake lining 89 into frictional engagement with another rotor face 95 which is opposite the face 83. The caliper leg 65 may be centrally apertured at 97 to reduce the overall weight of the device. Also, if desired, the brake shoe backing plate 87 may have an integral reinforcing portion 99 received in the aperture 97.

In use, therefore, pressurized fluid admitted to the cavity 69 biases the piston 75 toward the left and the caliper 63 toward the right, as seen in FIGS. 1 and 2, and both the piston and caliper are accurately guided and supported by the sleeve 57 which is rigidly secured to the torque spider 43. This presses the linings 81, 89 into frictional engagement with the rotor faces 83, 95, respectively, to slow or stop the vehicle wheel. Upon relieving fluid pressure to the bore 71, the biasing force on the piston 75 and caliper 63 is relieved and the rotor 31 is released. If desired, the seals 73, 76 carried by the caliper 63 and the sleeve 57, respectively, may have a generally rectangular cross-section so that when pressurized fluid is admitted to the bore 71 causing the piston 75 to move toward the left and the caliper 63 toward the right, the seals 73, 76 are twisted or distorted. Thus, upon release of this fluid pressure, the seals 73, 76 return to their original configuration and help return the caliper 63 and piston 75 toward the left and right, respectively.

As described above, the bore 71 is relieved at 69 and it will be appreciated that in use hydraulic fluid in the bore 71 will occupy the space between the sleeve 57 and the wall of the relief portion. This is important in that it provides a fluid bearing on which the caliper 63 slides during movement axially of the rotor 31. This arrangement enhances free sliding movement of the caliper 63 on the sleeve 57 and only the unrelieved portion of the bore 71 need be accurately machined. Also, this fluid bearing helps reduce noise and wear in the moving parts since all the sliding surfaces of the piston 75, sleeve 57 and caliper are lubricated by hydraulic fluid. Furthermore, and not of least importance is the fact that all the sliding surfaces here are virtually inaccessible to contamination by dirt, grease, etc., and are inaccessible to moisture which might tend to cause freeze-up at low temperatures.

When the brake linings 81, 89 are pressed into frictional engagement with the rotor faces 83, 95, torque is developed which tends to move each of the brake shoes 77, 85 in the direction the rotor 31 is turning. Torque on the brake shoe 77 is taken directly by the torque arm 53 in that the backing plate 79 of brake shoe 77 is confined between right-angle flanges 103, 105 formed at the sides of the torque arm 53. Torque on the brake shoe 85 is taken by the caliper 63 and is transferred to the torque arm 53 through the sleeve 57. The piston 75 is entirely free of any torque reaction and, therefore, its movement within the sleeve 57 remains unimpeded at all times.

Torque on the brake shoe 85 develops a force couple which tends to twist the caliper 63 about an axis extending generally radially of the torque arm 53 and substantially midway between its side edges. The effect of this force couple is resisted by the force of the pressurized fluid within the bore 71 which acts on the right-hand end of the sleeve 57 and on the end wall 84 of the bore 71. Furthermore, the force of hydraulic fluid acting radially on the sleeve 57 during brake application effectively stiffens the sleeve 57 and further adds to the overall strength and rigidity of the brake assembly.

It will be appreciated that a greater force is needed to apply the brake shoe 85 than is needed to apply the shoe 77 owing greatly to the greater weight of the caliper 63 as compared with the piston 75. Fluid pressure within the bore 71 acts on the piston 75 over an area equal to its cross-section. However, this same fluid pressure acts on the caliper 63 over an area equal to cross-sectional area of the piston 75 plus that of the sleeve 57. The differential between the forces acting on the caliper 63 and on the piston 75 is proportional to the cross-sectional area of the sleeve 57 so that by carefully selecting its size, the difference in the energizing forces acting on the brake shoes 77, 85 can be greatly reduced or eliminated. This, in turn, promotes more even wear on the brake lining 81, 89 and is a distinct advantage.

A modified form of the present invention is illustrated in FIG. 5. In this form, a machined cylinder bore 111 is formed in the caliper leg 67. A piston 113 is slidably disposed in the bore 111 and carries an annular seal 114 which engages the bore. The piston 113 has an elongated, reduced diameter extension 115 positioned to engage the backing plate 79 of brake shoe 77. A sleeve 117 slidably receives and supports the piston extension 115 and is accommodated by a relief area 118 in the piston 113. The sleeve 117 extends through an opening 119 in the torque arm 53 and is fixed to the torque arm 53 by welding at 120.

Like the embodiment of FIGS. 1–4, the caliper 63 and the piston 113 in this embodiment are accurately supported and guided by the sleeve 117 which is rigidly secured to the torque spider 143. This arrangement helps promote consistent operating characteristics and a good wear pattern on the brake linings and, in addition, the sliding surfaces here are relatively inaccessible to contamination by dirt, grease or other foreign matter.

In the embodiment of FIG. 5, torque on the brake shoe 77 is reacted directly at the torque arm 53 in the same fashion as in the form of FIGS. 1–4. Torque on the other brake shoe (not shown) of the embodiment of FIG. 5 is taken by the caliper 63 and is transferred to the torque arm 53 through the piston 113 and the sleeve 117.

Another modified form of the present invention is illustrated in FIG. 6 wherein a caliper and piston supporting and guiding sleeve 121 extends through an opening 123 in the torque arm 53 and has a radial flange 125 overlying the arm 53 and welded thereto at 127. The sleeve 121 is slidably received in a bore 128 formed in a leg 130 of the caliper 63 and the sleeve defines a cylinder bore 129 having a pair of pistons 131, 133 slidably disposed therein. The piston 131 is positioned to engage the backing plate 79 of brake shoe 77 and carries a generally rectangular cross-sectional seal 135 which sealingly engages the cylinder bore 129. The piston 133 is positioned to engage an end wall 137 of the bore 128 and carries an annular seal 139 which sealingly engages the cylinder bore 129.

Pressurized fluid is delivered to the cylinder bore 129 between the pistons 131, 133 through a conduit 141 connected to a passage 143 in the piston 133 by a coupling 145. The caliper leg 130 is slotted at 146 for reception of the coupling 145. This pressurized fluid acts on the pistons 131, 133 moving them apart, or toward the left and right, respectively, as seen in FIG. 6. Left-hand directional movement of the piston 131 presses the lining 81 of the brake shoe 77 toward the rotor face 83. Right-hand directional movement of the piston 133 moves the caliper 63 toward the right and presses the other brake shoe (not shown) against the face of the rotor 31 (not shown) opposite the face 83. A resilient O-ring 147 is positioned in the cylinder bore 129 and keeps the pistons 131, 133 from coming together. A bleed fitting 149 on the piston 133 communicates with the cylinder bore 129 above the passage 143 for bleeding the hydraulic system.

In use, torque on the brake shoe 77 is taken directly at the torque arm 53 in the same manner as in the embodiment of FIGS. 1–4. Torque on the other brake shoe (not shown) is taken by the caliper 63 and is transferred to the torque arm 53 through the sleeve 121. The caliper 63 and the pistons 131, 133 are accurately slidably guided and supported by the rigidly supported sleeve 121 and therefore misalignment or deflection of these parts during use is minimized. In addition, the sliding surfaces here are interior surfaces and are virtually inaccessible to contamination or freeze-up during use.

Still another embodiment of the present invention is illustrated in FIG. 7. In this embodiment, a stepped sleeve 151 is provided having one end received in an opening 153 in the torque arm 53. A radially outwardly extending flange 154 in the sleeve 151 seats against the torque arm 53 and the sleeve 151 is welded to the torque arm at 155.

The sleeve 151 is slidably received in a complementary stepped bore 157 in the caliper leg 67, and carries an annular sealing ring 159 which sealingly engages the wall of the bore 157.

A stepped piston 161 having a large inner end 160 and a smaller outer end 162 separated by a shoulder 164 is slidably received in the sleeve 151 and has its inner end 160 positioned to engage the backing plate 79 of brake shoe 77. The outer end 162 of the piston 161 is somewhat smaller in diameter than the adjacent portion of the sleeve 151 and together therewith defines a clearance area 166 to permit free passage of hydraulic fluid. A generally rectangular cross-sectional annular seal 163 is carried by the sleeve 151 and sealingly engages the piston 161 to prevent loss of fluid pressure therepast.

When pressurized fluid is admitted to the bore 157, the piston 161 is biased toward the left, as seen in FIG. 7, and presses the lining 81 of brake shoe 77 against the rotor face 83. The reaction of this fluid pressure acts against the end wall 168 of bore 157 and biases the caliper 63 toward the right to press the other brake shoe (not shown) against the rotor face (not shown) opposite the face 83.

As was true in the embodiment of FIGS. 1-4, torque on the brake shoe 77 is taken directly by the torque arm 53 and torque on the other shoe (not shown) is taken by the caliper 63 and is transferred to the torque arm 53 through the sleeve 151.

Here again, the caliper 63 and the piston 161 are accurately slidably supported and guided by the sleeve 151 and the sliding surfaces are interior surfaces so that the parts effectively resist contamination or freeze-up during use. Furthermore, fluid pressure in the bore 157 acts upon the right-hand end of the sleeve 151 and the sleeve shoulder 164 to effectively add to the rigidity of the sleeve 151 and resist the twisting effect of the force couple imposed on the caliper 63. This fluid also effectively lubricates the sliding joint between the piston 161 and the sleeve 151.

By the foregoing, there have been disclosed improved disk brake constructions calculated to fulfill the inventive objects set forth above, and while preferred embodiments of the present invention have been illustrated and described in detail above, various additions, substitutions, modifications and omissions may be made thereto without departing from the spirit of the invention as encompassed by the appended claims.

What is claimed is:
1. A disk brake for use with a brake rotor including a stationary torque member positioned adjacent one side of the rotor, a sleeve fixed to said torque member, a caliper embracing a segment of the rotor and having a reaction portion on one side of the rotor and a bore on the other side of the rotor, the cylindrical wall of said bore being slidably and sealably engageable with an outer peripheral surface of said sleeve to guide said caliper for movement in a direction parallel to the axis of the rotor, a first brake shoe carried by the reaction portion of said caliper and a second brake shoe positioned between the rotor and said bore, a piston sealingly and slidably disposed in said sleeve and operable in response to fluid pressure in said sleeve between said piston and an end wall of said bore to force said second brake shoe into engagement with the rotor.

2. The structure set forth in claim 1, in which said sleeve is formed from a tubular length of material welded to said torque member and in which said torque member is formed from sheet metal.

3. The structure set forth in claim 1, in which said sleeve is of stepped diameter and the inner and outer peripheral surfaces of said sleeve engaged by said piston and said bore wall, respectively, are of substantially equal diameter.

4. The structure set forth in claim 1 wherein said second brake shoe abuts said torque member for the direct absorption of braking torque by said torque member without the transmission of braking torque from said second brake shoe through said housing.

5. The structure set forth in claim 1, in which said torque member is provided with shoulder portions engageable with said caliper at circumferentially opposite sides thereof to absorb braking torque from said caliper.

References Cited
UNITED STATES PATENTS

| | | | |
|---|---|---|---|
| 3,182,754 | 5/1965 | Hahm et al. | 188—73 |
| 3,245,500 | 4/1966 | Hambling et al. | 188—73 |
| 3,265,160 | 8/1966 | Elberg et al. | 188—73 |
| 3,269,491 | 8/1966 | Belart et al. | 188—73 |
| 3,279,564 | 10/1966 | Gancel | 188—73 |

MILTON BUCHLER, *Primary Examiner.*

G. E. HALVOSA, *Assistant Examiner.*